Figure 1:
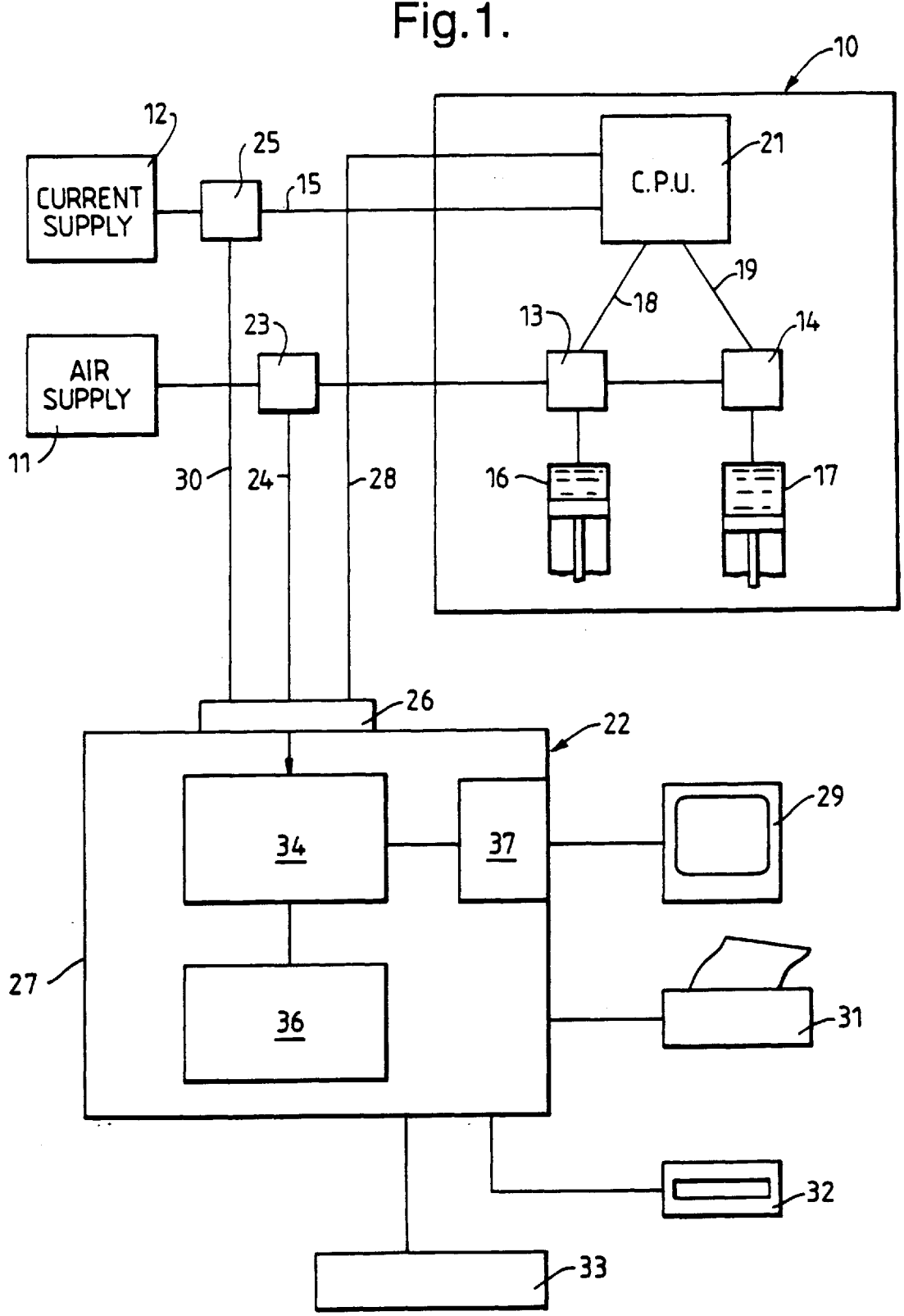

United States Patent
Gimblett et al.

[11] Patent Number: 5,893,047
[45] Date of Patent: Apr. 6, 1999

[54] MONITORING APPARATUS AND METHOD

[75] Inventors: Christopher Francis Gimblett, St. Leonards on Sea; Derek Mark Essam, Eastbourne, both of Great Britain

[73] Assignee: Drallium Industries, Ltd, Bexhill-on-Sea, England

[21] Appl. No.: 669,495

[22] PCT Filed: Jan. 11, 1995

[86] PCT No.: PCT/GB95/00046

§ 371 Date: Sep. 26, 1996

§ 102(e) Date: Sep. 26, 1996

[87] PCT Pub. No.: WO95/19589

PCT Pub. Date: Jul. 20, 1995

[30] Foreign Application Priority Data

Jan. 12, 1994 [GB] United Kingdom .................. 9400484
Nov. 7, 1994 [GB] United Kingdom .................. 9422407

[51] Int. Cl.⁶ .................................................. G06F 15/46
[52] U.S. Cl. ........................ 702/33; 702/42; 364/470.01; 364/470.14; 364/476.01
[58] Field of Search ................ 364/551.01, 468.01, 364/468.24, 474.16, 570, 470.01, 470.14, 183, 184, 476.01, 528.1; 324/73.1; 702/42, 33

[56] References Cited

U.S. PATENT DOCUMENTS

| | | | |
|---|---|---|---|
| 4,550,278 | 10/1985 | Yamanaka | 364/164 |
| 4,553,321 | 11/1985 | Zihlmann et al. | 29/598 |
| 4,559,828 | 12/1985 | Liszka | 73/658 |
| 4,587,670 | 5/1986 | Levinson et al. . | |
| 4,744,227 | 5/1988 | Whitener, Jr. et al. | 66/163 |
| 4,786,908 | 11/1988 | Runnalls | 342/63 |
| 4,812,995 | 3/1989 | Girgis et al. | 364/481 |
| 4,835,699 | 5/1989 | Mallard | 364/188 |
| 4,979,487 | 12/1990 | Fukui . | |
| 4,987,528 | 1/1991 | O'Brien | 364/184 |
| 5,029,212 | 7/1991 | Yoshida . | |
| 5,067,099 | 11/1991 | McCown et al. | 364/550 |
| 5,136,499 | 8/1992 | Rydborn | 364/185 |
| 5,225,988 | 7/1993 | Barea | 364/470.01 |
| 5,228,061 | 7/1993 | Newby et al. | 375/94 |

FOREIGN PATENT DOCUMENTS

| | | | |
|---|---|---|---|
| 0 069 375 A1 | 1/1983 | European Pat. Off. | C03B 9/40 |
| 0 096 830 A2 | 12/1983 | European Pat. Off. . | |
| 0 300 053 A1 | 1/1989 | European Pat. Off. | B29C 45/76 |
| 0 328 064 A3 | 8/1989 | European Pat. Off. . | |
| 2 106 279 | 4/1983 | United Kingdom | G05B 23/00 |
| 2 144 862 | 3/1985 | United Kingdom . | |
| 2 235 915 | 3/1991 | United Kingdom . | |
| 90/09644 | 8/1990 | WIPO | C07C 3/00 |

*Primary Examiner*—John Barlow
*Assistant Examiner*—Hien Vo
*Attorney, Agent, or Firm*—Wilson Sonsini Goodrich & Rosati

[57] ABSTRACT

The present invention provides a method of monitoring a cyclic system comprising a plurality of cyclic means, comprising measuring a single parameter for the complete cyclic system, and, during a learning mode, cycling the cyclic system a plural number of times, and from the measured value of the parameter, providing a range of acceptable values, and during a subsequent monitoring mode comparing the measured value of said parameter with said range of values, and providing an output signal if the measured value of the parameter is outside said range of values. An apparatus for monitoring such a cyclic system is also provided, including a transducer means connected to detect one parameter of the cyclic system, a means to distinguish a learning mode of the system from a monitoring mode, a receive means to receive the output signal from the transducer means at predetermined points in the cycle of the cyclic system, a memory means operable during the learning mode to store values, a means to provide ranges of said values for each point in the cycle, a comparison means operable during the monitoring mode to compare for each point in the cycle the value of the output signals detected with the range of values for that point, and a means to provide a signal if the detected values are outside their range.

29 Claims, 6 Drawing Sheets

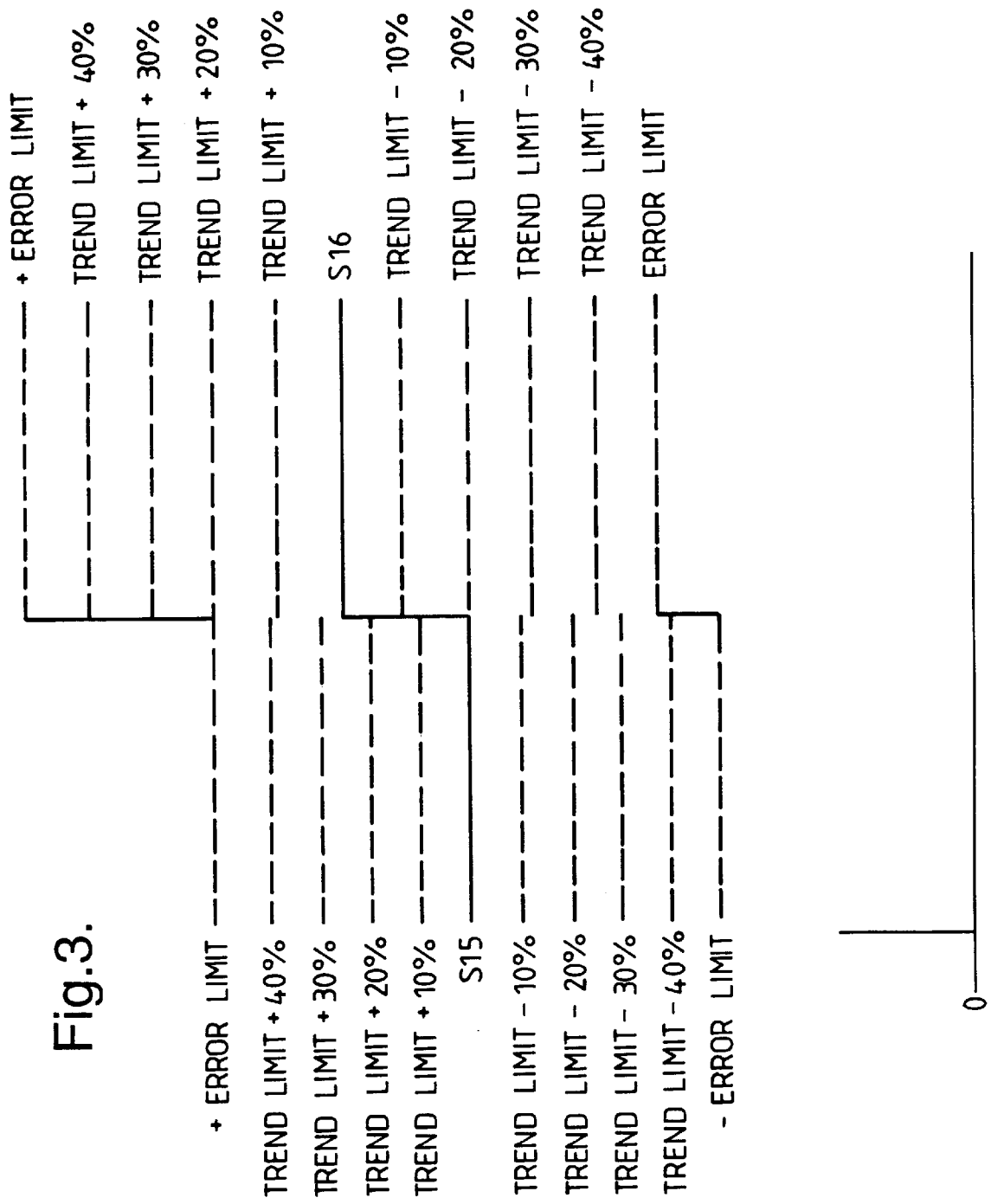

TIME PROCESSING

AMPLITUDE

TIME

Fig.5A
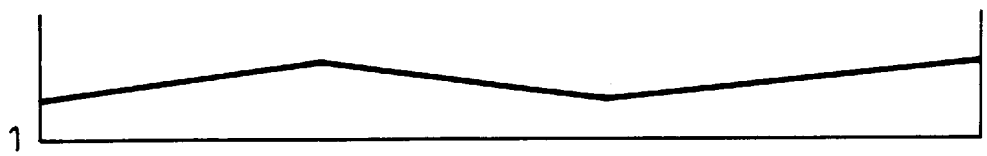
Fig.5B.
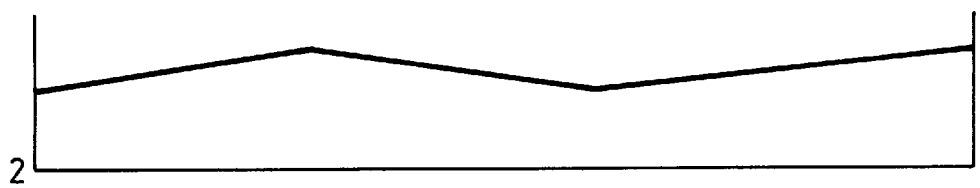
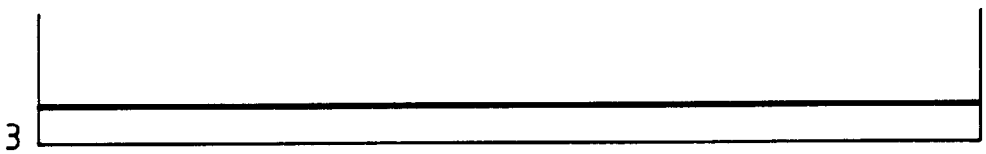
Fig.5C
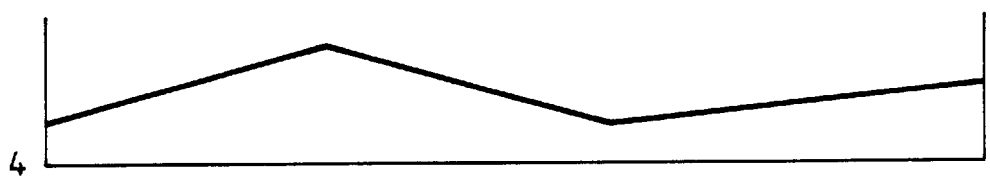
Fig.5D
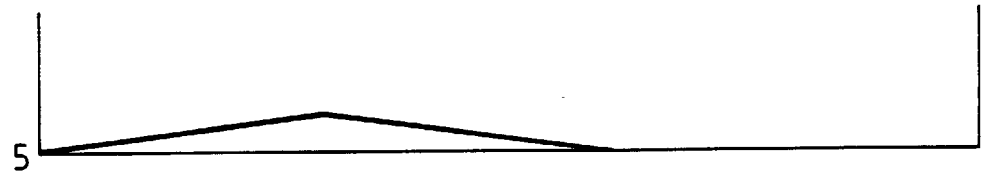
TIME

MONITORING APPARATUS AND METHOD

The present invention relates to monitoring apparatus and method. The apparatus and method are particularly applicable to monitoring cyclic systems, that is systems such as machines that carry out repetitive tasks, although in the preferred arrangement it is not necessary that they carry out only one task so long as there is a limited number of tasks that will each be repeated in time. Other cyclic systems may comprise tidal or river or flow, or cyclic use of a car park, station or the like.

In the case of cyclic machines (such as robots, machine tools, packaging machines, photocopiers) it may be possible to monitor each component of a multicomponent cyclic apparatus individually, for example monitor the movement of each ram in a pneumatic apparatus, but this requires many monitoring transducers and is expensive and in any case control of such a monitoring apparatus is difficult.

The present invention provides, according to one aspect, a method of monitoring a cyclic system comprising a plurality of cyclic means, comprising measuring a single parameter for the complete cyclic system, and, during a learning mode, cycling the cyclic system a plural number of times, and from the measured value of the parameter, providing a range of acceptable values, and during a subsequent monitoring mode comparing the measured value of said parameter with said range of values, and providing an output signal if the measured value of the parameter is outside said range of values.

The present invention provides, according to another aspect, a monitoring apparatus for monitoring a cyclic system comprising;
  transducer means connected to detect one parameter of the cyclic system (for example, air or fluid flow in a pneumatic or hydraulic system, current in an electrical system, sound in a mechanical system, temperature, any key supply supplied to all parts of the apparatus or a digital image);
  means to distinguish a learning mode of the system from a monitoring mode;
  receive means to receive the output signal from said transducer means at predetermined points in the cycle of the cyclic system;
  memory means operable during said learning mode to store values (such as amplitude, time from the start of the cycle, time from the previous detected point in the cycle, rate of change of amplitude, direction, relationship with signals relating to other parameters detected at the same or different times) relating to the output signal from said transducer means at said predetermined points in the cycle;
  means to provide ranges of said values for each point in the cycle;
  comparison means operable during the monitoring mode to compare for each point in the cycle the value (normally, the averaged value from a plurality of cycles) of the output signals detected with the range of values for that point,
  and means to provide a signal if the detected values are outside their range (which may be used to provide an indication, normally after the error continues for a predetermined time).

Whilst the apparatus may be used to monitor a simple cyclic apparatus such as a single motor or ram, it is preferably used to monitor a multicomponent cyclic apparatus such as a robot or machine tool which includes many components such as rams by monitoring a parameter (a "key supply") common to all parts, such as the overall flow of air or hydraulic fluid to the apparatus or electric power supplied or by monitoring a digital (e.g. video) image of the system.

Particularly where the parameter being measured is air, fluid, or current flow, the monitoring apparatus can be arranged so as not to interfere with the operation of the cyclic apparatus. The non-invasive nature of the monitoring apparatus can be particularly important because it means that it can be applied to a pre-existing system or a predesigned system without any particular modification. For example where air flow is to be measured, it is simply a matter of installing in the air supply line to the cyclic apparatus a flow transducer or if an electric current is to be measured, simply providing a electrical current sensor in the current supply to the apparatus so that a current flow signal can be tapped off.

Furthermore, because the monitoring apparatus does not require pre-existing information regarding the cyclic system to which it is to be attached, the same monitoring apparatus may be used for a variety of cyclic apparatus. The monitoring apparatus will learn during its learning mode all of the details of the operation of the cyclic apparatus which it requires to know. Thus the same monitoring apparatus might be used, with a suitable transducer, to monitor a robot system using pneumatics, a system containing multiple electric motors by measuring the electric current, or the operation of an engine by providing an aural transducer.

Means may also be provided to distinguish at which point or points in the cycle the signal lies outside its range. This means may include a further transducer means which may be used to detect another parameter (for example the first parameter detected by the transducer means may be an air flow signal and the second parameter may be an electric signal). In this way, it may be possible to readily indicate at which point in the system the fault occurs, for example where an electrical signal indicates that a new section of the cyclic apparatus has been switched on then if the air flow signal indicates a fault then clearly the fault is likely to lie in the section which has just been switched on. Alternatively, the point in the cycle at which the signal lies outside its range nay be provided by timing means which times from the beginning of the cycle, and in this case, it may be particularly convenient if means is provided to detect the start signal of a cycle by suitably connecting this means to a position in, for example, the electrical of the cycling apparatus from which the cycle start signal is produced. Memory means may be provided to store comparisons between faults in the cyclic apparatus and the signals at the point or points in the cycle the signal(s) lie outside its/their range (which comparisons we will hereafter refer to as a library) whereby an indication of the fault may be provided. Means may be provided to add information to the library.

In this way, when an unknown fault occurs in the cyclic apparatus the identity of the fault may be added to the library along with the pattern of signals so that the fault may be identified in the future.

Means may be provided to provide said ranges of values by an algorithm using standard deviation (SD) techniques.

Furthermore, said comparison means may be operable, to compare the number of predetermined points in a cycle in which said detected values lie outside their respective ranges and to control said signal providing means (37) to provide a signal if said number exceeds a predetermined criterion.

The present invention also provides, according to a further aspect, a method of monitoring a cyclic system comprising detecting a parameter of the system (for example, air or fluid flow in a pneumatic or hydraulic system, current in an electrical system, sound in a mechanical system) receiving the output signal from said transducer means at predetermined points in the cycle of the cyclic apparatus, during a learning mode, storing values (such as amplitude, time from the start of the cycle, time from the previous detected point in the cycle, rate of change of amplitude, direction, relationship with signals relating to other parameters detected at the same or different times) at said predetermined points in the cycle of the cyclic apparatus and calculating ranges of said values for each point in the cycle, during the monitoring mode comparing the values of the output signals detected with a range of values, and providing a signal if the detected values are outside their range.

The learning mode may be carried out not only at a different, earlier time than the monitoring mode, but in a different location. In this way, experience learnt by other systems may be incorporated in a particular system.

In a specific example of the invention, therefore, one might use the apparatus and method of the invention with a robot system which includes a plurality of rams which are driven pneumatically from a single pressure air supply. A transducer is connected to measure the air flow rate. When the first robot system is built, it is put through a series of tests, and the monitoring apparatus which is in its learning mode, will, from the first ten or hundred or thousand cycles of operation, set out the range of signal values which it knows are acceptable.

However inevitably faults will occur in the operation of the cyclic robot apparatus. The monitoring apparatus is set to its learning mode when any signal value is outside its range and as faults occur, details of the fault are entered in the table so that, in future, if a similar sequence of error signals occurs, the apparatus will be able to indicate and, usually predict the occurrence of that fault.

Once the robot machine has been found to be acceptable it is set in operation and the monitoring is set to its monitoring mode. When it detects a pattern of signals predicting a fault, it may produce a suitable warning signal. It is not intended that it should control the robot apparatus.

Although the monitoring apparatus is in its monitoring mode, it can still learn signal patterns relating to new faults. Inevitably not all faults will occur during initial testing of the robot system, and means may be provided for a service engineer to enter details of the fault which he finds in the library.

Furthermore, the library may be stored in an electronic memory and therefore the information from libraries of other similar machines may be passed to the robot system so that all of the robot systems may recognise faults which that particular robot apparatus has never experienced.

It will be noted that the monitoring apparatus of the first robot apparatus has an empty library and knows nothing of the system to which it is attached. Thus a single design of monitoring apparatus may be attached to a variety of systems of different designs, such as different robot systems, machine tools, and the like and will learn about the system during testing and operation.

We have referred to faults and whilst this may mean faults which occur suddenly or appear over a short period of time, we also include changes due, for example, to wear. Thus one may add to the ranges learnt above to take into account slowly occurring changes due to wear.

One may provide a system that allows wear prediction for maintenance purposes. Once a large enough database exists for a given machine or family of machines (OEM), a program may be run, that analyses the current pattern and gives the predicted lifetime for each component on which data is held. This allows more efficient maintenance, as only parts likely to fail before the next maintenance period would need to be replaced.

Figure 2A:
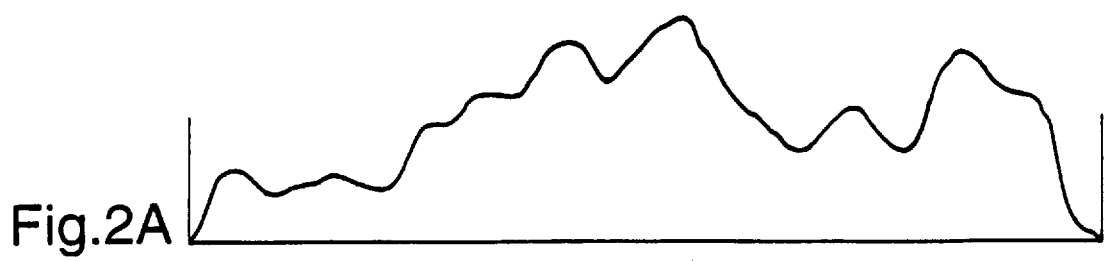
Figure 2B:
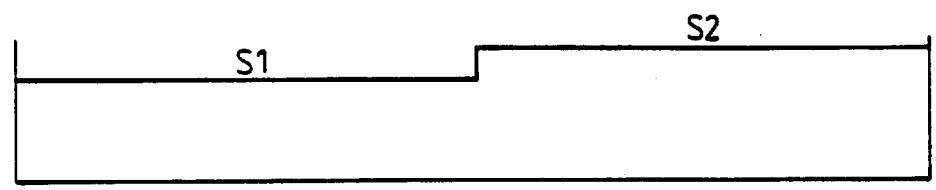
Figure 2C:
Figure 2D:
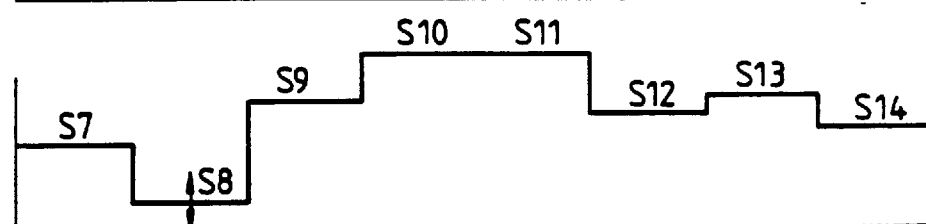
Figure 2E:
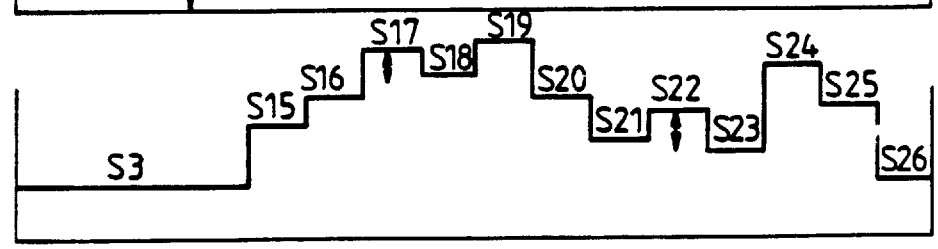
Figure 2F:
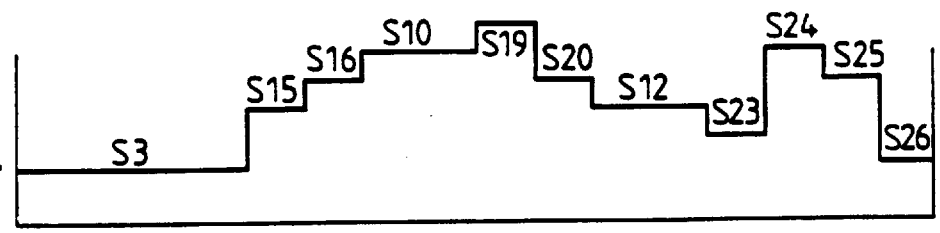
Figure 6:
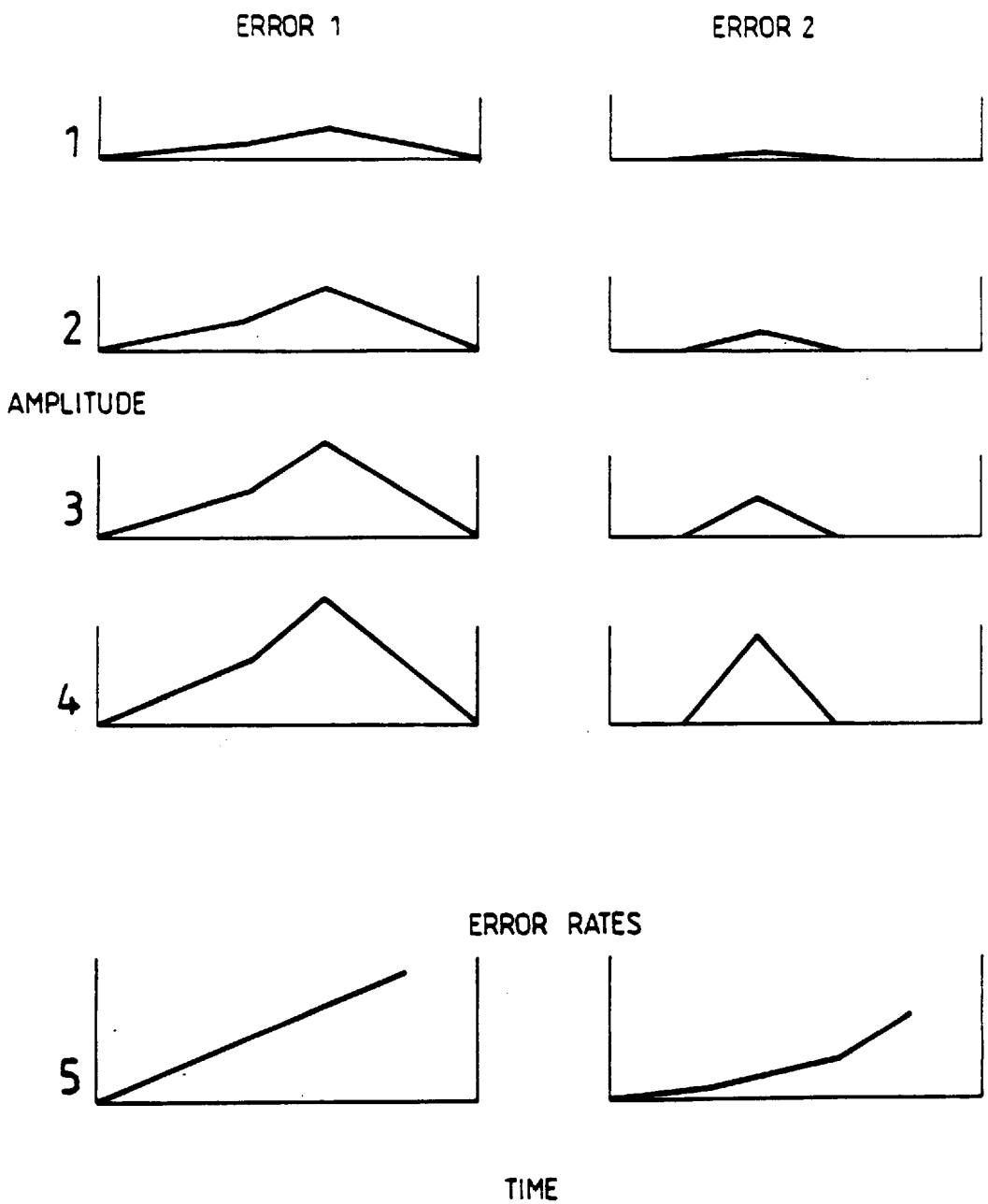

Preferred embodiments of the invention will now be described by way of example only and with reference to the accompanying drawings in which:

FIG. 1 is a diagram of a monitoring apparatus according to the invention applied to a cyclic apparatus and providing a preferred embodiment in the invention, FIGS. 2A–2F show a succession of signals illustrating how, during the learning process, an averaged set of signal values is produced, FIG. 3 shows part of the signal of FIG. 2F (but enlarged) with error limits and trend limits shown, FIGS. 4A–4D illustrates various signals received from the cyclic apparatus and as processed, showing changes of the timing signal, FIGS. 5A–5D illustrates various signals received from the cyclic apparatus and as processed, showing changes of the amplitude signal, and, FIG. 6 shows various error signals derived from FIGS. 4A–4D and 5A–5D.

Referring to FIG. 1 there is shown an example of a cyclic apparatus which may be monitored by apparatus of the invention, and an example of monitoring apparatus according to the preferred embodiment of the invention.

The cyclic apparatus 10 comprises a pneumatic apparatus driven by a pressure air supply 11, air from the pressure supply 11 being passed to a plurality of pneumatic valves 13,14 which connects the pressure air supply 11 to selected rams 16,17. The pneumatic valves 13,14 are controlled by means of electrical signals on lines 18,19 which in turn are controlled by a central processing unit 21. In addition, the cyclic apparatus 10 is supplied with electric current from electric current supply 12 along line 15. The cyclic apparatus 10 may be, for example, a pneumatic robot system, such as a multi-arm robot which may be used for assembly of articles or painting of articles as is well known. In an alternative arrangement the cyclic apparatus may be a humanoid robot the parts of which (such as limbs, eyes, mouth) are moved by pneumatic rams. The apparatus operates cyclically, that is if it is a paint spray robot, then the cyclic apparatus 10 operates the rams 16,17 in a series of movements to move the paint spray head in a particular manner through a complete cycle for each article as it is sprayed, or if it is a humanoid robot, moves the limbs, eyes etc of the robot through a predetermined cyclical sequence.

Monitoring apparatus 22 is provided to monitor the cyclic apparatus 10, to monitor its performance and, for example, to predict faults or to provide an indication of wear or reduction of performance. For example it might be obvious if a particular part of the cyclic apparatus ceases to operate, but what may be less obvious is if one of the rams 16 or 17, owing to wear or dirt or for other reasons, does not extend or contract to the required position but ceases movement before reaching the required position, or operates more slowly. Such a problem may only become obvious when the painting carried out by the robot becomes faulty.

The monitoring apparatus 22 is connected to a flow transducer 23 in the form of a turbine in the air supply line from the pressure air supply 11 which provides a signal on line 24 indicating the flow of air from the pneumatic air supply 11 to the cyclic apparatus 10. The monitoring apparatus 22 is also connected to a second transducer 25 in the form of a current sensor (eg, a transformer) in line 15, the output of transducer 25 being passed along line 30 to a multiplexed interface 26.

The line 24 is connected via the multiplexed interface 26 to the monitoring apparatus 22. The interface 26 is connected to a microprocessor 27 which is in turn connected to a random access memory RAM 28. The microprocessor 27 is connected to a visual display unit 29, a printer 31, a disk drive 32 and a keyboard 33. In detail, the microprocessor 27 includes receive means 34 connected to receive the signals from the interface 26, a calculator means 36 and means 37 to provide an output signal to operate the VDU 29.

Learning Mode

It will be noted that initially the monitoring apparatus 22 need not contain any data about the cyclic apparatus 10. The only information which need be previously available to the monitoring apparatus 22 is a series of algorithms setting out how incoming signals from the lines 24 and 30 may be processed.

In use of the apparatus shown in FIG. 1, a code is entered on the keyboard to indicate to the monitoring apparatus 22 that it is initially to operate in the "learning mode".

During the learning mode, the cyclic apparatus 10 is run through a number of cycles that cover all operating modes for the cyclic apparatus. It is necessary for these initial cycles to be operated with the cyclic apparatus operating correctly without faults, errors or significant wear.

During this learning process, the monitoring apparatus 22 receives a varying signal from the transducers. We will only consider the signal from transducer 23 but the same learning and monitoring processes will be carried out on signals from all of the transducers. It will be understood that during a cycle of operation of the cyclic apparatus, the flow of air from the pressure air supply 11 past the transducer 23 will vary through the cycle depending on the cyclic operation of the various rams 16,17. Where there are a large number of rams, a typical cyclic signal might be as shown in FIG. 2A. Where the monitoring apparatus 22 is a digital electronic apparatus, the data received along line 24 will, in fact, be digital but for simplicity FIG. 2A shows analogue signals.

In a digital system, the signal value from the transducer is sampled at intervals determined by the system clock and these sample points will be referred to later as data sampling points. In a typical example, digital sample signals may be taken at 100–1000, typically 250 points of the cycle.

During successive cycles in the learning process, a succession of identical or substantially identical cyclic signals such as shown in FIG. 2A are applied to the monitoring apparatus. The initial algorithm of the monitoring apparatus divides each cyclic signal into two equal length parts and provides an average amplitude value of the signal over the first half (shown as S1) and second half (shown as S2) of the cycle as shown in FIG. 2B. If, after, say, 10 cycles, the two average values S1 and S2 remain the same (within a predetermined limit), the monitoring apparatus will then, over the successive cycles, divide the next incoming cyclic signals into four equal segments as shown in FIG. 2C and provides an average of the signal value over each of these four segments (S3,S4,S5,S6) as shown in FIG. 2C. If after ten or so cycles the four average values S3, S4, S5, S6 remain the same within closely defined limits, the monitoring apparatus will then divide the cyclic signal into eight equal segments as shown in FIG. 2D and similarly provide average signals (S7–S14) over the successive ten cycles.

Let us assume in this case that the average signal value S8 of the signal values S7–S14 does not remain substantially constant but varies (this particular part of the cycle might be subject to random change). Then the monitoring apparatus divides that part of the cyclic signal including signal S8 in accordance with the preceding division step so that a steady set of average signal values is obtained. Therefore for this part of the signal one reverts to segment S3. Thus as shown in FIG. 2E, the first part of the signal has reverted to S3 as shown in FIG. 2C, but the remaining part of the cycle can be divided down once again to provide signal values S15–S26.

Let us assume that in this case, signal values S17 and S22 are unstable when averaged. Then as with FIG. 2D, the monitoring apparatus replaces S17 by S10 and S22 by S12.

FIG. 2F shows the way in which the cycle is divided into time segments which are averaged during this learning process and each time segment provides a stable value of average signal over a large number of cycles. From this point on, for the signal from this particular transducer, the monitoring apparatus will always average cyclic signals in this way, in multiples of sixteenths over the cycle as follows; T=0–4; 4–5; 5–6; 6–8; 8–9; 9–10; 10–12; 12–13; 13–14; 14–15; 15–16.

FIGS. 2A–2F show one example for ease of description. In practice one will normally divide the signal into much smaller intervals than shown in this Figure, and successive intervals may be divided not by two but by three or five or ten.

In this way, the signal is divided into time segments which provide suitable average signals of a sufficiently stable nature but with the maximum resolution.

It is assumed in the above that from the signal received on line 24 it will be possible to readily determine the beginning of each cycle. However if the signal is in the form shown in FIG. 2A, this would be difficult and in such a case, it will be desirable to provide a reference start of cycle signal which may be provided by a direct line 38 from the CPU 21 to the microprocessor 27 via the multiplexer 26. This signal will normally be an electric signal.

In one example, it is also necessary that a set of "error limits" be entered for the stored average signal values for each segment. These limits may either be entered manually through the keyboard 33 or may be automatically provided by the monitoring apparatus 22 as a percentage (which may be less than or greater than 100%) of the difference between the average signal for a particular segment and the maximum excursion of signal which has been detected for that segment during the learning process. The apparatus also requires that trend limits (defined as a sub-division of the error percentage) be provided. FIG. 3 illustrates for two signal values S15 and S16 for successive segments with error limits of +50% and trend limits of 10%, 20%, 30%, 40%. These values have been chosen for ease of illustration, but in practice much narrower error limits will be used.

A similar learning process takes place with the signal from the other transducer 25 either simultaneously, or if there is insufficient processing power, after the first transducer signal has been dealt with.

After the learning process has been completed, for each cycle the monitoring apparatus 22 will have stored in its memory 28 an average amplitude value of the signals on lines 24 and 30 for each time segment through the cycle (which segments may be of different lengths, and indeed of different lengths for each transducer) together with timing signals defining the beginning and end of each segment, error values and trend limits.

We will define these signals as stored averaged learned signals (SAL signal). When the monitoring apparatus has completed this learning phase, that is, when each new cycle has little or no effect on the average signals for all of the segments through the cycles of all of the transducer signals, then the apparatus may indicate on the VDU 29 that the learning process is complete and automatically or by control from the keyboard 33 as desired, switch over to monitoring mode.

Monitoring Mode

When switched to this mode the apparatus monitors the operation of the cyclic apparatus to determine faults and trends.

In general terms, in the monitoring mode, the monitoring apparatus compares the signals received from a transducer with the stored averaged learned signal for the same transducer and using the error limits and trend limits detects whether there are any problems with the cyclic apparatus. During the monitoring mode, the monitoring apparatus receives the signals to be monitored and averages them over a predetermined number of cycles. In practice it compares this stored averaged detected signal with the stored averaged learned signal. however, before these two signals can be compared, the stored averaged detected signal must be timed adjusted to produce a time corrected stored averaged detected signal (TCSAD signal).

Time Adjustment of SAD Signal

As mentioned, before considering the amplitude of the deleted signal one must determine the timing of the signal. For example the cyclic apparatus may slow down or speed over the course of a period of time owing to wear or for other reasons. In these circumstances the cycle time will increase or decrease and this can be determined by noting the difference in time between successive reference start signals.

These timing changes may be of two types, a progressively increasing delay through the cycle so that all of signal values occur at a point later than during the learning process, and the delay is evenly spread throughout the cycle so that the later signal values are later by a greater amount than the earlier signal values. This indicates a constant slowing down of the cyclic apparatus being monitored. The opposite can happen, the apparatus "frees-up" as it wears, the cycle time may actually reducing rather than increasing but the principle is the same.

A second timing problem arises when over most of the cycle the signal varies at the normal rate but one or more parts of the cycle takes longer than before. This is indicative of a fault in part of the cyclic apparatus only.

For each transducer the SAD signal and the signal being monitored will consist of pairs of digital values for each data sampling point in a cycle. Each pair of digital values will consist of an amplitude value and a time reference value (ie, an indication of the time of the data sampling point from the beginning of the cycle).

To compare an active (but stored) signal which has just been monitored and the learned (averaged) signal the following procedures are used.

The time reference values for each data sampling point in a cyclic SAD signal are summed and the totals for the SAD and SAL signals are compared. Any difference between the totals is calculated as a percentage (T%). If there is no difference the algorithm passes onto the amplitude comparison step. If a difference does exist, then the SAD signal is "time adjusted" in the following manner.

The time references from each data sampling point of the SAD signal is multiplied by T% and compared to the time reference values from the SAL signal. If this reveals a fairly close match then the "time adjustment" step is terminated and T% is stored.

If it does not then each time reference value from the SAD signal is compared in turn with the corresponding time reference values for each data sampling point from the SAL signal to determine whether a common time adjustment can be found for a significant number of data sampling points within the two signals. If this is so, then the time reference values for these data sampling points are discarded (they can be retrieved by using T%) and a time difference graph (TDG) is generating from the remaining values and stored.

In this way a library of T% and TDG can be built up over a period of time. As each new combination of T% and TDG is generated it may be compared with those already held in the library in order to determine whether it has occurred before. In other words, the values of T% and TDG recorded may be used to predict whether a particular fault is likely to occur.

Figure 4A:
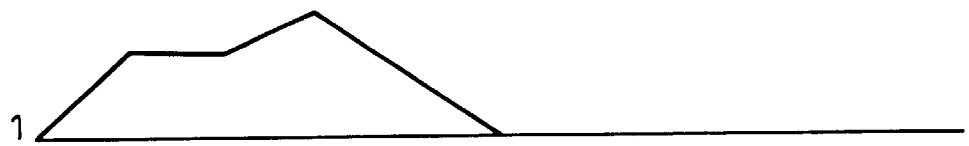
Figure 4B:
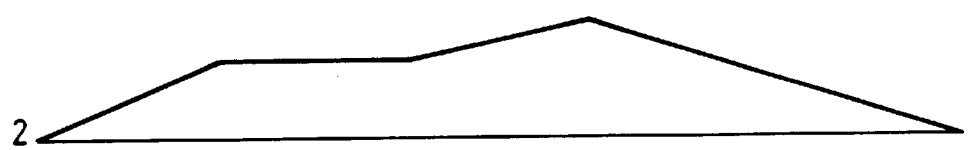
Figure 4C:
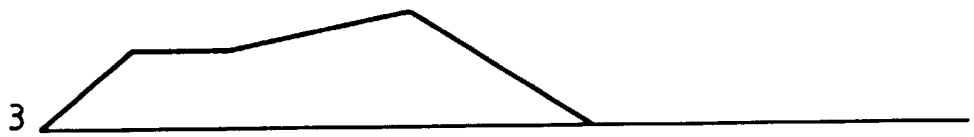

The time adjustment of SAD signal may be understood by reference to FIGS. 4A–4D. FIG. 4A shows for one of the transducers, the SAL signal. FIG. 4A shows a typical SAD signal of a first type, and FIG. 4C shows a typical SAD signal of a second type.

Referring to the cyclic signal of FIG. 4B it will be noted that each data sampling point is progressively later as one goes through the cycle and in this circumstance, in carrying out the time adjustment process, one finds that T% is 50%. Multiplying the time values for each of the data sampling points in the signal of FIG. 4B changes the signal of 4B into a signal identical to that of 4A. This is indicative of a simple slowing down of the cycle in which in this simple example the cycle time in FIG. 4B is twice the length of FIG. 4A.

The SAD stored signal shown in FIG. 4C, however, is different. As is readily obvious, from the time point 0 to point 2, the SAD signal is identical to that of FIG. 4A. Similarly, from point 4 to point 6, the SAD signal is identical to the corresponding part of the SAL signal of FIG. 4A between point 3 and 5. However the part of the SAD signal between points 2 and 4 has been "stretched" with respect to the corresponding part of the signal between points 2 and 3 of the signal of FIG. 4A.

Figure 4D:
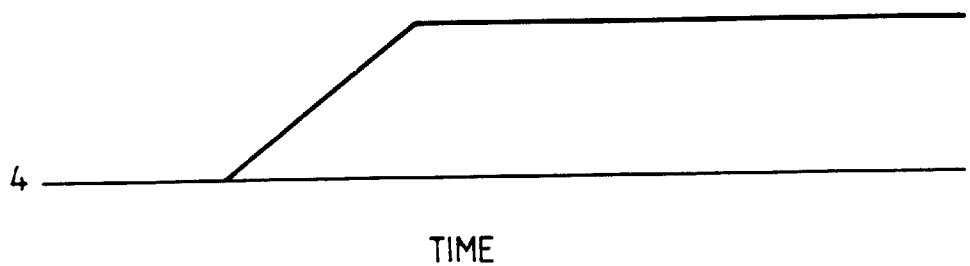

In the time adjustment process, the values for FIG. 4C between points 1 and 2 and points 4 and 6 will be discarded (in this case T%=0) but a time difference graph (TDG) has to be provided for the points between 2 and 4 and this graph is shown in FIG. 4D.

At the end of the time adjustment process, the T% and the TDG is applied to the active stored signal to retrieve an accurately timed signal on which amplitude comparison can take place. This signal we will call "corrected time" signal (CT signal) which will also be stored.

The time adjustment process is carried out separately for the signals from each transducer.

Amplitude Comparison Of Signal

In each case, the CT signals for each transducer are used for amplitude comparison.

In the monitoring mode, the monitoring apparatus will initially average the CT signals for the segments of the cycle (the segments having been determined, as described above, during the learning phase) and holds an average value of the amplitude data for each segment.

This average will be compared with the average for the same segment obtained from the learning process. If, for any segment, the average is within the error limit and does not cross a trend limit it is ignored. On the other hand, if the signal value is beyond the error limit or passes a trend limit, then this is noted and held in the memory.

In detail the amplitude signal for the first segment of the corrected time signal will be compared with the amplitude signal for the same segment on the SAL signal and an adjustment factor A% calculated such that when the amplitude signal of the data point of the CT signal is multiplied by this A%, it corresponds to the same amplitude signal for the same segment in the SAL signal. The amplitude signals for all of the subsequent segments in that corrected time signal will be multiplied by the same adjustment factor A% and these new values will be compared with the corresponding amplitude values of the SAL signal. The resultant differences from this comparison of each segment will be stored as a total (T1). The process will then be repeated for each segment in turn giving a set of totals (T1) to (TN). Once this process is completed the smallest value of (T1) to (TN) indicates the closest match. The A% for this value is used to adjust all the amplitude readings from the corrected time signal and the set of differences between the segments of the CT and SAL signals are stored as an amplitude error graph (AEG).

In this way a library of A% and AEG values may be built up over a period of time. As each new combination of A% and AEG is generated, it may be compared with those already held in the library in order to determine whether it has occurred before.

We now refer to FIGS. 5A–5D. FIG. 5A shows a SAL signal as derived from the learning process. FIGS. 5B and 5D are two different types of CT amplitude signals, both of which, however, have been time corrected.

Referring to FIG. 5B, it will be noted that FIG. 5B is the same as FIG. 5A but with a constant signal added.

Fault Prediction

As indicated above, the memory of the monitoring apparatus stores in a library information about the times and pattern over which a signal value from a particular segment of cyclic signal and from a particular transducer has changed. If subsequently the signal value for that particular segment of that transducer exceeds the error limit then the monitoring apparatus provides a signal on the VDU 29.

At this point a human operator may examine the cyclic apparatus 10 and determine the problem, and may then enter into the monitoring apparatus 22 via the keyboard 33 an indication of the fault or problem. The monitoring apparatus 22 will then connect the preceding pattern of values of T%, TDG, A%, AEG over time, and patterns of the signals crossing the trend lines the relevant information regarding the fault or problem and if this pattern is repeated then it will indicate to the VDU information regarding the fault or problem.

The apparatus may be set to produce reports via the VDU or otherwise either at regular intervals or on demand and this should show the CT signal, the current average readings for each data point together with a predicted time to failure (failure being defined in this sense as the point in time where the average reading for a segment will exceed the preset error limits for that segment).

In addition the apparatus may be set to produce a warning report where it is deduced that the predicted failure time for a segment will occur before the next scheduled report if the reports are only provided at regular intervals.

Furthermore, the monitoring apparatus may then review the patterns whereby the signal for the particular segment exceeded the trend limits and, subsequent to the above process, may, from an examination of the current (in time) signal value for that segment be able to determine the likely time to the error signal being produced. In other words, if in previous excursions of the signal to the error limit, the error signal pass the successive ten trend limits, for example, at the rate of one per day, then if the current signal for that segment has passed trend point 5, then one might expect that the error limit would be exceeded in another five days.

Cross corrections of the signal on lines 24 and 30 may enable one to readily indicate at which point in the system the fault occurs; for example where the electrical signal on line 30 indicates that a new section of the cyclic apparatus has been switched on then if the air flow signal indicates a fault then clearly the fault is likely to lie in the section which has just been switched on. Alternatively, the point in the cycle at which the signal lies outside its range may be provided by timing means which times from the beginning of the cycle, Master/Slave Option So far, the monitoring apparatus has been described in terms of a complete apparatus for attachment to a single cyclic apparatus. It will be understood, that identical but separate monitoring apparatus may be attached to a plurality of identical cyclic apparatus and faults and problems which are encountered during the operation of one particular cyclic apparatus may be passed either directly, or via, for example, a floppy disk, from one monitoring apparatus to another so that by passing this error information around between the various monitoring apparatus attached to the different cyclic apparatus, the monitoring apparatus becomes more and more "intelligent" and have more information in their memory as to the types of errors which may be encountered. Indeed in these circumstances, a monitoring apparatus attached to a particular cyclic apparatus may be able to predict a fault which that cyclic apparatus has never experienced, the fault having been experienced by another cyclic apparatus.

Furthermore, as time goes on, when a new monitoring apparatus is applied to a newly manufactured cyclic apparatus, the monitoring apparatus may be preloaded with all of the information which is currently existing as to errors and faults and so over the course of time, the monitoring apparatus provided will become more able. Such an arrangement might be particularly useful where, for example, the cyclic apparatus is apparatus such as a photocopier in which there are a large number of similar photocopiers provided at a plurality of remote locations. Service engineers may, when correcting a fault, down load the error information from the memory of the particular monitoring apparatus concerned and this may be built into new photocopiers and applied to existing photocopiers as the service engineers service them.

The apparatus may be used to monitor a simple cyclic apparatus such as a single motor or ram, as well as a multicomponent apparatus such as a robot or machine tool which includes many moving components such as rams.

The non-invasive nature of the monitoring apparatus can be particularly important because it means that it can be applied to a pre-existing system or a predesigned system without any particular modification.

As already mentioned the monitoring apparatus does not require pre-existing information regarding the cyclic system to which it is to be attached, and so the same monitoring apparatus may be used for a variety of cyclic apparatus. In other words, one may take a monitoring apparatus straight from the factory with no information regarding the system which it is to monitor, and applied to an unknown cyclic apparatus. The monitoring apparatus will learn during its learning mode all of the details of the operation of the cyclic apparatus which it requires to know. Thus the same type of monitoring apparatus might be used, with a suitable transducer, to monitor a robot system using pneumatics as described above, or, a system containing multiple electric motors by measuring the electric current, or the operation of an engine by providing an aural transducer.

Whilst clearly a monitoring apparatus will detect when a machine breaks down, it is not primarily intended to do so but is intended to monitor operation of the apparatus and to detect when the apparatus is beginning to malfunction and even preferably predict when a breakdown might occur. It will be noted from the description that an error level in the signal has been set and generally this error level will be at a value at which the cyclic apparatus requires servicing rather than at a level where part of the apparatus has broken. Thus the monitoring detects a pattern of signals predicting a fault it may produce a suitable warning signal. It is not intended that the monitoring apparatus should control the cyclic apparatus. In the arrangement described it is likely that the monitoring apparatus would be too slow to control the cyclic apparatus although there might be some circumstances which this was possible if desired.

The invention is not restricted to the details of the foregoing example. In a particular preferred arrangement, it is preferable to separate the higher level monitoring process from the more day to day monitoring. Thus the intelligent part of the process, during the learning mode, in particular, may be carried out by a monitoring system in which a monitor apparatus is connected to the machine to be monitored, and to a computer (which may be a standard PC). The computer includes the software so that during the learning process, the monitor apparatus monitors the system, and the PC, driven by the software, provides the pattern analysis.

During the monitoring mode, the monitor apparatus by itself, without the computer, can monitor the cyclic apparatus. It is arranged so as to detect patterns which are outside the normal. When such a pattern is detected, the computer is connected to the monitoring apparatus with the software installed and may then monitor the cyclic apparatus so as to predict a fault.

In this way, it is not necessary to tie up a computer to the cyclic apparatus at all times.

The apparatus has also so far been described to produce a stored averaged learned signal (SAL signal) which includes error values and trend limits. In an alternative arrangement, the SAL signal need not have error values and trend limits. The software may, using mathematical standard deviation analytical techniques, determine a set of rules which defines when the detected signal is outside normal. As is well known, from the successive signal values for each data sampling point in the cycle one may calculate, by standard well known mathematical analysis a "standard deviation" (SD). Thus for each point through the cycle, there will be, in addition to the signal value, a standard deviation (SD) which is derived mathematically (usually during the learning mode). The software may include a series of rules which determine whether the signal is within limits or outside limits. For example the limits might be covered by a set of rules as follows:

Rule 1: an error value for a particular point in the cycle will be detected if the signal. at any point, is more than, for example, three standard deviations (SD) from normal.

Rule 2: an error value for a particular point in the cycle will be detected if, for any point in the cycle, over three successive cycles, in two cases out of three the signal value is more than one standard deviation from normal.

Rule 3: an error value for a particular point in the cycle will be detected if, for any point in the cycle, over five successive cycles, in three or more of the cycles, the signal value is more than two standard deviations from normal.

Clearly other sets of rules can be provided as circumstances require.

When the apparatus comes to compare an error pattern over a period of cycles with those errors patterns stored in its memory, it might compare the error pattern with each stored error pattern in the following way.

Comparison 1. Compare the percentage of the total cycle over which an error has been detected with the stored error pattern.

Comparison 2. Compare the percentage of overlap (in time) of the detected error with the stored error pattern.

Comparison 3. Compare the type of error detected (ie, does it infringe Rules 1,2 or 3 above) with the stored error pattern.

By considering these three comparisons, one can gauge whether the error is of a known type.

Thus, for example, if the error is of the same type (ie, infringes the same Rules) and there is an error over the same percentage of the cycle and there is considerable overlap then it is likely that the two errors are identical (ie, it is probable that the same component is at fault in the same way as the stored pattern).

If the error is present over the same percentage of the cycle, and the error type is the same but the overlap is not great or is zero, then it may that it is the same type of error as that stored in the stored pattern but may not be exactly the same component but may be another similar component which is used elsewhere in the cycle. Thus, for example, if the stored error pattern relates to a torn seal in a particular type of piston, then this would indicate that it is the same type of piston with a torn seal but a different piston used at a different point in the cycle.

We claim:

1. A cyclic system comprising;
  a plurality of cyclic means comprising a plurality of separately operable means provided with a common source of power,
  transducer means connected to detect one parameter related to the source of power of the cyclic system common to the plurality of cyclic means;
  and monitoring apparatus comprising;
  means to distinguish a learning mode of the system from a monitoring mode;
  receive means to receive the output signal from said transducer means at predetermined points in the cycle of the cyclic system;
  memory means operable during said learning mode to store values relating to the output signal from said transducer means at said predetermined points in the cycle;
  means to provide ranges of said values for each said point in the cycle;
  calculator means, operable during the monitoring mode, to compare, for each said point in the cycle the value of the output signal detected with the range of values for that point,
  and indicator means to provide an indication signal if detected values are outside their range.

2. A system as claimed in claim 1 in which distinguishing means is provided to distinguish at which point or points in the cycle the detected value lies outside its range.

3. A system as claimed in claim 2 in which said distinguishing means includes a further transducer means to detect another parameter.

4. A system as claimed in claim 2 which said distinguishing means comprises timing means for timing from the beginning of the cycle.

5. A system as claimed in claim 4 in which means is provided to detect the start signal of a cycle.

6. A system as claimed in claim 1 in which said means to provide ranges of said values for each point in the cycle provides said ranges of values during repetitive cycling of said system during said learning mode.

7. A system as claimed in claim 1 in which said means to provide ranges of said values for each point in the cycle provides at least some of said ranges as predetermined ranges.

8. A system as claimed in claim 1 including means to provide said range of values by an algorithm using standard deviation (SD) techniques.

9. A system as claimed in claim 1 in which said memory means also stores said ranges of values.

10. A system as claimed in claim 1 in combination with a pneumatic system, said plurality of cyclic means comprising a plurality of means which are driven pneumatically from a single pressure air supply, said transducer means being connected to measure the air flow rate to the pneumatic system.

11. A system as claimed in claim 1 in which said predetermined points are such that said parameter is provided to or by a different combination of said plurality of cyclic means in different proportions so that said calculator means is operable, during the monitoring mode, to determine which cyclic means are at fault from which point in the cycle the value of the output signal detected is outside the range of values for that point.

12. A cyclic system as claimed in claim 1 in which an indicator means is provided to provide an indication signal if detected values over a plurality of cycles are changing towards the edge of the range of values.

13. A system as claimed in claim 1 in which the memory means stores patterns of change of the output signal from said transducer means at said predetermined points in the cycle and data relating to faults of the cyclic system related to that change of pattern.

14. A system as claimed in claim 13 in which said calculator means is operable during the monitoring mode, to compare, for each said point in the cycle, the pattern or change of detected value with the stored patterns and if the detected pattern is the same or similar to the stored pattern in the memory.

15. A method of monitoring a cyclic system comprising a plurality of separately operable means provided with a common source of power, said method comprising;

detecting a parameter related to the source of power of the system at predetermined points in the cycle of the cyclic system;

during a learning mode cycling the cyclic system a plural number of times, storing values relating to the detected signal at said predetermined points in the cycle of the cyclic system; and calculating ranges of said values for each point in the cycle, and during a monitoring mode, comparing for each said predetermined point in the cycle the values of the signals detected with a range of values, and providing a signal if detected values are outside their range.

16. A method of monitoring a cyclic system comprising a plurality of separately operable means provided with a common source of power, comprising measuring a single parameter related to the source of power for the complete cyclic system, and, during a learning mode, cycling the cyclic system a plural number of times, and from the measured value of the parameter, providing a range of acceptable values, and during a subsequent monitoring mode comparing the measured value of said parameter with said range of values, and providing an output signal if the measured value of the parameter is outside said range of values.

17. A method as claimed in claim 16 in which said parameter comprises the flow rate of an air supply to a cyclic system which comprises a plurality of pneumatic means.

18. A method as claimed in claim 16 in which said parameter comprises an electric current supplied to a cyclic system which comprises a plurality of electric operated means.

19. A method as claimed in claim 1 in which said parameter comprises the sound produced by the cyclic system.

20. A method as claimed in claim 1 in which the parameter is derived from a digital image of the cyclic system.

21. A monitoring apparatus for monitoring a cyclic system comprising a plurality of separately operable means provided with a common source of power;

transducer means connected to detect a parameter related to the source of power of the cyclic system;

and monitoring apparatus comprising;

means to distinguish a learning mode of the system from a monitoring mode;

receive means to receive the output signal from said transducer means at predetermined points in the cycle of the cyclic system;

memory means operable during said learning mode to store values relating to patterns of change of the output signal from said transducer means at said predetermined points in the cycle and data relating to faults of the cyclic system related to that change of pattern;

calculator means, operable during the monitoring mode, to compare, for each said point in the cycle the pattern of change of the output signal detected with the stored patterns, and indicator means to provide a signal if the patterns of change of detected values are the same or similar to patterns stored in the memory.

22. A method of monitoring a cyclic system comprising a plurality of separately operable means provided with a common source of power, said method comprising;

detecting a parameter related to the source of power of the system at predetermined points in the cycle of the cyclic system;

during a learning mode cycling the cyclic system a plural number of times, storing values relating to patterns of change of the output signal from said transducer means at said predetermined points in the cycle and data relating to faults of the cyclic system related to that change of pattern, and during a monitoring mode, comparing for each said predetermined point in the cycle the pattern of change of the output signal detected with the stored patterns, and providing a signal if the patterns of change of detected values are the same or similar to patterns stored in a memory.

23. A method as claimed in claim 22 in which the signal provided if the patterns of change of detected values are the same or similar to patterns stored in the memory provides an indication of the data relating to the fault of the cyclic system related to that change of pattern.

24. A cyclic system comprising;
- a plurality of cyclic means comprising a plurality of separately operable means provided with a common source of power,
- transducer means connected to detect a parameter related to the source of power of the cyclic system common to the plurality of cyclic means;
- and monitoring apparatus comprising;
- receive means to receive the output signal from said transducer means at predetermined points in the cycle of the cyclic system;
- memory means operable to store values relating to the output signal from said transducer means at said predetermined points in the cycle;
- means to provide ranges of said values for each said point in the cycle;
- calculator means, operable to compare, for each said point in the cycle the value of the output signal detected with the range of values for that point,
- and indicator means to provide an indication signal if detected values are outside their range.

25. A method of monitoring a cyclic system comprising a plurality of separately operable means provided with a common source of power, said method comprising;
- detecting a parameter related to the source of power of the system common to the plurality of cyclic means at predetermined points in the cycle of the cyclic system;
- storing values relating to the detected signal at said predetermined points in the cycle of the cyclic system; and calculating ranges of said values for each point in the cycle, and
- comparing for each said predetermined point in the cycle the values of the signals detected with a range of values, and providing a signal if detected values are outside their range.

26. A monitoring apparatus for monitoring a cyclic system comprising a plurality of separately operable means provided with a common source of power;
- transducer means connected to detect a parameter related to the source of power of the cyclic system;
- and monitoring apparatus comprising;
- receive means to receive the output signal from said transducer means at predetermined points in the cycle of the cyclic system;
- memory means operable to store values relating to patterns of change of the output signal from said transducer means at said predetermined points in the cycle and data relating to faults of the cyclic system related to that change of pattern;
- calculator means, operable to compare, for each said point in the cycle the pattern of change of the output signal detected with the stored patterns,
- and indicator means to provide a signal if the patterns of change of detected values are the same or similar to patterns stored in the memory.

27. A method of monitoring a cyclic system comprising a plurality of cyclic means comprising a plurality of separately operable means provided with a common source of power, said method comprising;
- detecting a parameter of the system related to the source of power common to the plurality of cyclic means at predetermined points in the cycle of the cyclic system;
- during a learning mode cycling the cyclic system a plural number of times, storing values relating to patterns of change of the output signal from said transducer means at said predetermined points in the cycle and data relating to faults of the cyclic system related to that change of pattern, and
- during a monitoring mode, comparing for each said predetermined point in the cycle the pattern of change of the output signal detected with the stored patterns, and providing a signal if the patterns of change of detected values are the same or similar to patterns stored in a memory.

28. A method of monitoring a cyclic system comprising a plurality of cyclic means, said method comprising;
- detecting a parameter of the system common to the plurality of cyclic means at predetermined points in the cycle of the cyclic system;
- storing values relating to the detected signal at said predetermined points in the cycle of the cyclic system, and calculating ranges of said values for each point in the cycle; and
- comparing for each said predetermined point in the cycle the values of the signals detected with a range of values, and providing a signal if detected values are outside their range, said predetermined points being such that said parameter is provided to or by a different combination of said plurality of cyclic means in different proportions whereby to determine which cyclic means are at fault from which point in the cycle the value of the output signal detected is outside the range of values for that point.

29. A monitoring apparatus for monitoring a cyclic system comprising;
- transducer means connected to detect a parameter of the cyclic system;
- and monitoring apparatus comprising;
- receive means to receive the output signal from said transducer means at predetermined points in the cycle of the cyclic system;
- memory means operable to store values relating to patterns of change of the output signal from said transducer means at said predetermined points in the cycle and data relating to faults of the cyclic system related to that change of pattern;
- calculator means, operable to compare, for each said point in the cycle the pattern of change of the output signal detected with the stored patterns,
- and indicator means to provide a signal if the patterns of change of detected values are the same or similar to patterns stored in the memory, said predetermined points being such that said parameter is provided to or by a different combination of said plurality of cyclic means in different proportions so that said calculator means is operable to determine which cyclic means are at fault from which point in the cycle the value of the output signal detected is outside the range of values for that point.

* * * * *

UNITED STATES PATENT AND TRADEMARK OFFICE
CERTIFICATE OF CORRECTION

PATENT NO.   : 5,893,047
DATED        : April 6, 1999
INVENTOR(S)  : Gimblett, et al It is certified that error appears in the above-identified patent and that said Letters Patent is hereby corrected as shown below:

On the title page, item [73] Assignee: delete "Drallium Industries, Ltd." and insert:

--Drallim Industries, Ltd.--.

Signed and Sealed this

First Day of February, 2000

Attest:

Q. TODD DICKINSON

*Attesting Officer*   *Acting Commissioner of Patents and Trademarks*